United States Patent
Stretton

(10) Patent No.: US 8,322,652 B1
(45) Date of Patent: Dec. 4, 2012

(54) THRUST MOUNT ARRANGEMENT FOR AN AIRCRAFT ENGINE

(75) Inventor: Richard G. Stretton, Loughborough (GB)

(73) Assignee: Rolls-Royce, PLC, London (GB)

( * ) Notice: Subject to any disclaimer, the term of this patent is extended or adjusted under 35 U.S.C. 154(b) by 525 days.

(21) Appl. No.: 12/691,263

(22) Filed: Jan. 21, 2010

(30) Foreign Application Priority Data

Feb. 23, 2009 (GB) .................................. 0902909.1

(51) Int. Cl.
B64D 27/00 (2006.01)

(52) U.S. Cl. .............................. 244/54; 60/797; 248/554

(58) Field of Classification Search .................... 244/54, 244/55, 131; 60/69.31, 69.32, 797; 248/554, 248/555, 556, 557

See application file for complete search history.

(56) References Cited

U.S. PATENT DOCUMENTS

| | | | |
|---|---|---|---|
| 5,303,880 A * | 4/1994 | Cencula et al. ................. | 244/54 |
| 5,320,307 A | 6/1994 | Spofford et al. | |
| 5,725,181 A | 3/1998 | Hey | |
| 5,873,547 A | 2/1999 | Dunstan | |
| 5,921,500 A * | 7/1999 | Ellis et al. ....................... | 244/54 |
| 6,296,203 B1 | 10/2001 | Manteiga et al. | |
| 6,474,597 B1 | 11/2002 | Cazenave | |
| 6,494,403 B2 * | 12/2002 | Jule et al. ......................... | 244/54 |
| 6,758,438 B2 * | 7/2004 | Brefort et al. ................... | 244/54 |
| 7,021,585 B2 * | 4/2006 | Loewenstein et al. ......... | 244/54 |
| 7,108,224 B2 * | 9/2006 | Pasquer et al. ................. | 244/54 |
| 2001/0025902 A1 * | 10/2001 | Jule et al. ........................ | 244/54 |
| 2004/0251380 A1 * | 12/2004 | Pasquer et al. ................. | 244/54 |
| 2005/0067528 A1 * | 3/2005 | Loewenstein et al. ......... | 244/54 |
| 2008/0169377 A1 * | 7/2008 | Levert ............................. | 244/54 |
| 2009/0308972 A1 * | 12/2009 | Foster ............................. | 244/54 |
| 2010/0181419 A1 * | 7/2010 | Haramburu et al. ............ | 244/54 |

FOREIGN PATENT DOCUMENTS

| | | |
|---|---|---|
| EP | 0 564 126 A1 | 10/1993 |
| EP | 0 805 108 A2 | 11/1997 |
| EP | 0 879 759 A2 | 11/1998 |
| EP | 1493663 A1 * | 1/2005 |

OTHER PUBLICATIONS

U.K. Search Report issued in British Application No. 0902909.1 on Jun. 11, 2009.

* cited by examiner

*Primary Examiner* — Benjamin P Lee
(74) *Attorney, Agent, or Firm* — Oliff & Berridge, PLC

(57) ABSTRACT

A thrust mount arrangement is disclosed for mounting a gas turbine engine to an aircraft via a pylon. The thrust mount arrangement comprises a mounting bracket fixedly mountable to said pylon, and a pair of thrust links connected to said mounting bracket and connectable to said engine so as to define in combination with said mounting bracket a primary load path between the engine and the pylon to carry engine loads under normal operating conditions. The arrangement is characterized in that said thrust links are each configured to engage the pylon directly in the event of failure of the primary load path, so as to define an auxiliary load path between the engine and the pylon. This arrangement thus provides an auxiliary load path which follows a different route to the primary load path, by eliminating the mounting bracket from the auxiliary load path. This provides a more robust arrangement in the event that the mounting bracket itself should fail.

12 Claims, 3 Drawing Sheets

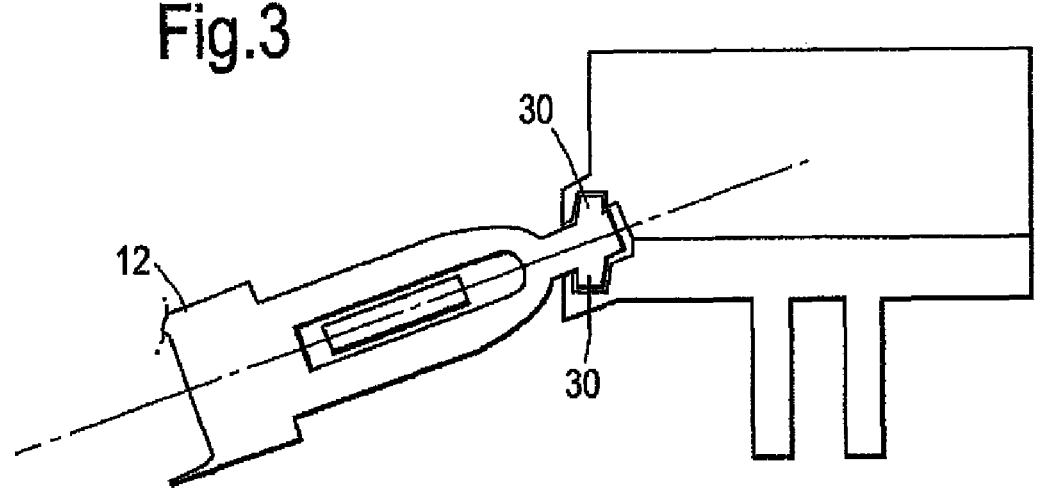
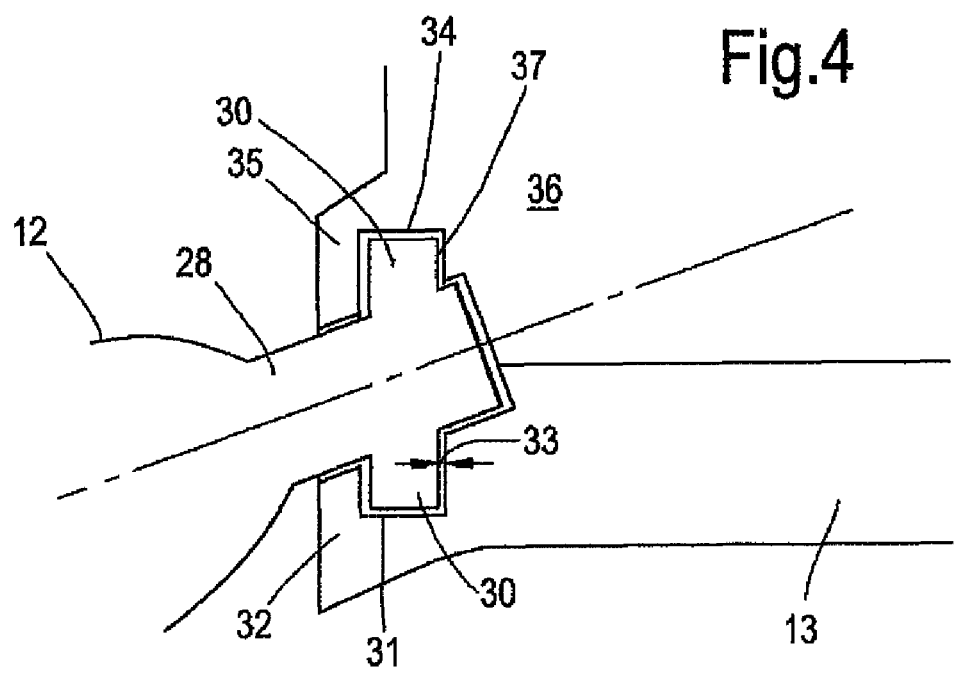

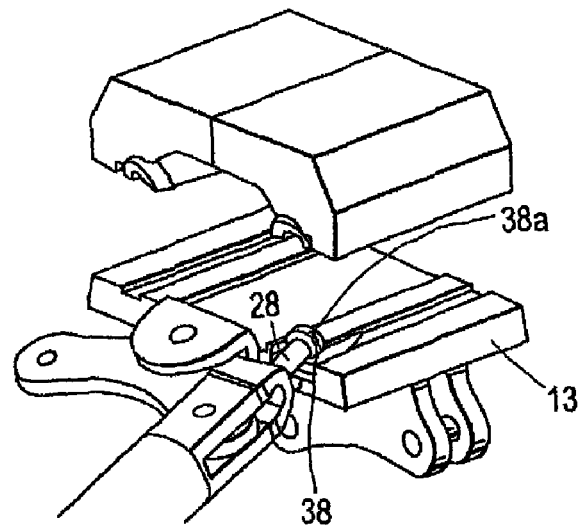
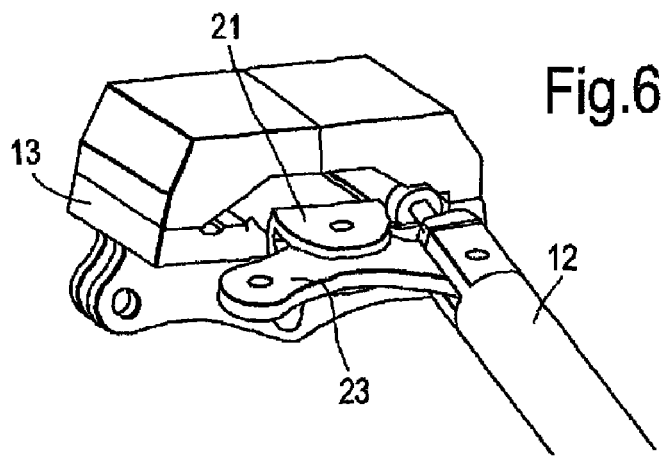
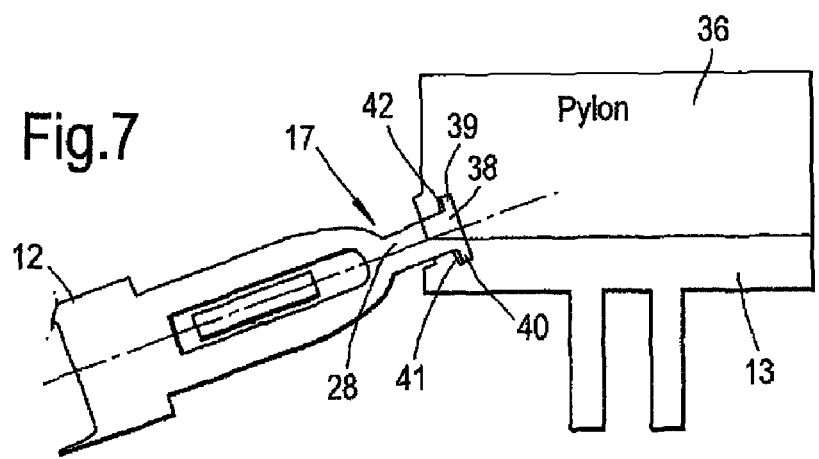

THRUST MOUNT ARRANGEMENT FOR AN AIRCRAFT ENGINE

The present invention relates to a thrust mount arrangement for an aircraft engine. More particularly, the invention relates to a thrust mount arrangement for mounting a gas turbine engine to an aircraft via a pylon.

It is conventional to mount propulsive gas turbine engines to aircraft via the use of a pylon secured beneath the wing of the aircraft or within a tail section of the aircraft. In a wing-mounted arrangement, the pylon extends downwardly from the aircraft wing and a thrust mounting arrangement interconnects the engine to the pylon and so to the aircraft.

The engine is typically mounted at its forward end in the region of the compressor section of the core engine, and at its aft end generally in the region of the turbine section of the engine, for transmitting loads to the pylon. These loads generally include vertical loads arising from the weight of the engine itself, axial loads arising from the thrust generated by the engine, as well as side loads arising from factors such as wind buffeting, and roll, pitch and yaw loads arising from normal operation of the engine.

Engine thrust mount arrangements are provided in order to transfer the axially directed thrust loads generated by the engine to the pylon. These loads arise in tension during forward propulsion of the aircraft, but compressive loads occur during braking of the aircraft upon landing as a result of use of the engine's thrust reverser mechanism.

Conventional thrust mounts have been developed which generally include a pair of circumferentially spaced apart elongate thrust links which are connected at their forward ends to a forward region of the engine frame in a pivotal manner. The opposite, aft ends of the thrust links are pivotally connected to respective ends of a thrust balance beam (sometimes referred to as a "whiffle-tree"), with the centre of the balance beam being pivotally connected to an engine mounting platform. The engine mounting platform is fixedly mounted to the pylon, and also supports the aft region of the engine via a supporting frame arrangement.

During normal forward propulsion of the aircraft, the forward axial thrust generated by the engine is carried through the thrust links (which are thus in tension) and through the pivotal connection between the centre of the balance beam and the mounting bracket, and in turn on to the pylon. The pivotal connection between the balance beam and the mounting bracket allows a small degree of rotation of the balance beam relative to the mounting bracket in order to equalise the axial load carried by each of the two thrust links. As will be appreciated, when the engine's thrust reverser mechanism is actuated, the engine generates a rearwardly directed thrust force which is carried through the thrust links in compression and which again passes through the pivotal connection between the balance beam and the mounting bracket, and on to the pylon.

It is essential that modern thrust mount arrangements are designed for failsafe operation in the event of a failure occurring in any of the structural components of the arrangement. It is therefore conventional to design the thrust mount arrangement so as to provide an auxiliary load path between the engine and the pylon in order to ensure that the thrust loads generated by the engine are properly transmitted to the pylon in the event of the normal, primary load path described above failing.

U.S. Pat. No. 5,320,307 discloses a thrust mount arrangement in which two thrust links are connected to the engine casing at their forward ends and to the engine mounting bracket at their rear ends, via a balance beam or so-called "whiffle-tree", in order to transfer thrust loads into the mounting bracket. In a conventional manner, the mounting bracket is fixedly mounted to the aircraft pylon. The arrangement of U.S. Pat. No. 5,320,307 provides a secondary failsafe arrangement in order to handle a failure situation in which one of the two thrust links or their attachment to the balance beam should fail. The failsafe arrangement transfers the axial retention via the remaining thrust strut into the engine mounting bracket. As will therefore be understood, in this arrangement both the primary load path and the auxiliary failsafe load path pass through the main engine mounting bracket. U.S. Pat. No. 5,725,181, U.S. Pat. No. 5,873,547 and U.S. Pat. No. 6,296,203 also provide generally similar arrangements in which auxiliary load paths are directed into the main engine mounting bracket.

In the event of a failure occurring along the primary thrust load path, it would be advantageous to provide an arrangement in which the auxiliary load path follows an alternative structural route, rather than also relying upon the integrity of the engine mounting bracket, so as to minimise the risk of the initial failure propagating from the primary load path to the secondary failsafe load path. U.S. Pat. No. 6,474,597 seeks to address this problem by proposing the provision of an intermediate fitting which lies between the engine mounting bracket and the pylon, effectively being trapped therebetween, and which carries the auxiliary failsafe load path. This arrangement thus provides an auxiliary load path which does not pass via the main engine mounting bracket. However, the intermediate fitting of this arrangement introduces additional weight, complexity and part-count to the overall structure which is disadvantageous.

It is therefore an object of the present invention to provide an improved thrust mount arrangement for mounting a gas turbine engine to an aircraft via a pylon.

According to the present invention, there is provided a thrust mount arrangement for mounting a gas turbine engine to an aircraft via a pylon, the arrangement comprising: a mounting bracket fixedly mountable to said pylon, and a pair of thrust links connected to said mounting bracket and connectable to said engine so as to define in combination with said mounting bracket a primary load path between the engine and the pylon to carry engine loads under normal operating conditions, the arrangement being characterised in that said thrust links are each configured to engage the pylon directly in the event of failure of the primary load path, so as to define an auxiliary load path between the engine and the pylon.

As will be explained in more detail below, it is preferable that the thrust links are connected to the mounting bracket indirectly, via a thrust balance beam or "whiffle-tree" arrangement. It should therefore be appreciated that the thrust links do not need to be connected directly to the mounting bracket without an intermediary.

Furthermore, in a preferred arrangement, each thrust link is held captive between the pylon and the mounting bracket when the mounting bracket is fixedly mounted to the pylon. However, the arrangement is advantageously configured so that during said normal operating conditions, or under engine failure conditions such as when a fan blade becomes damaged or detached, each said thrust link does not engage the pylon in a significantly load-bearing manner.

Such an arrangement may therefore be configured in such a way that the pylon is provided with a respective clearance hole or recess within which a first part of each thrust link is received, the arrangement being configured such that during normal operating conditions said first part of each thrust link is spaced from the inner surface of its respective hole or recess by a clearance gap, but is arranged to engage said inner surfaces in the event of failure of the primary load path. Engagement between the thrust links and the pylon via the inner surfaces of the clearance recess or holes in this way establishes an auxiliary load path from the engine to the pylon via the or each remaining intact thrust link. The auxiliary load path thus does not pass through the mounting bracket, and so is structurally independent of the engine mounting bracket.

In preferred embodiments of the present invention, the mounting bracket is also provided with a respective clearance hole or recess within which a second part of each thrust link is received, the arrangement being configured such that during normal operating conditions said second part of each thrust link is spaced from the inner surface of its respective clearance hole or recess provided in the mounting bracket by a clearance gap, but is arranged to engage said inner surfaces in the event of failure of the primary load path. This arrangement thus allows engagement between the thrust links and the mounting bracket via the clearance holes or recesses provided in the bracket, for example in the event that the primary load path is broken through failure of the balance beam or "whiffle-tree". In this situation the auxiliary load path will still run directly from the or each surviving thrust link to the pylon, but will also pass through the mounting bracket if the bracket itself remains intact, thereby increasing the integrity of the auxiliary load path.

Preferably, each said clearance hole or recess provided in the mounting bracket is arranged so as to be aligned with and opposed to a respective said clearance hole or recess provided in the pylon across the interface between the pylon and the mounting bracket when the mounting bracket is fixed to the pylon.

The or each said part of each thrust link may comprise a projection extending substantially perpendicular to the longitudinal axis of the thrust link. Alternatively, the projection may extend substantially perpendicular to the rotational axis of the engine. For example, the or each said projection may take the form of a spigot. Alternatively, however, said first part of each thrust link may be defined by one end of a pin extending through the thrust link, with said second part of each thrust link being defined by the opposite end of said pin.

It is preferable for embodiment of the present invention to be configured to allow the engine mounting bracket to be removed from, or offered up to the aircraft pylon mount in a substantially vertical direction. It is proposed that initial alignment and guidance of the engine mounting bracket relative to the pylon mount, during engagement of the two, will be controlled by the provision of guidance pins or shear pins fitted to the aircraft pylon mount pad.

Preferably, each said thrust link is connectable at a first end to the engine, and is pivotally connected in the region of an opposite second end to a thrust balance beam (sometimes referred to in the art as a "whiffle-tree"), the thrust balance beam being pivotally connected to the mounting bracket. This forms the indirect connection between the thrust links and the mounting bracket mentioned above.

Conveniently, the or each said part of each thrust link is provided at said second end.

In preferred arrangements of the present invention, the or each said part of each thrust link is provided at the second end of the thrust link, and the thrust link is pivotally connected to the balance beam at a point spaced a short distance inwardly of the second end. The thrust links thus effectively have short extensions which extend past the point at which they are connected to the balance beam, the extensions projecting into a space defined between the pylon and the mounting bracket.

So that the invention may be more readily understood, and so that further features thereof may be appreciated, embodiments of the invention will now be described by way of example with reference to the accompanying drawings in which:

FIG. 3 is a schematic cross sectional view taken through part of the arrangement illustrated in FIG. 2;

FIG. 4 is an enlarged view of part of the arrangement illustrated in FIG. 3;

FIG. 5 is a schematic perspective view from the front and one side of a thrust mount arrangement in accordance with an alternative embodiment of present invention, showing the arrangement during assembly;

FIG. 6 is a schematic perspective view from the front and the other side of the arrangement illustrated in FIG. 5 showing the arrangement in a subsequent state of assembly;

FIG. 7 is a schematic cross sectional view corresponding generally to that of FIG. 3, but illustrating the alternative embodiment of FIGS. 5 and 6.

Figure 1:
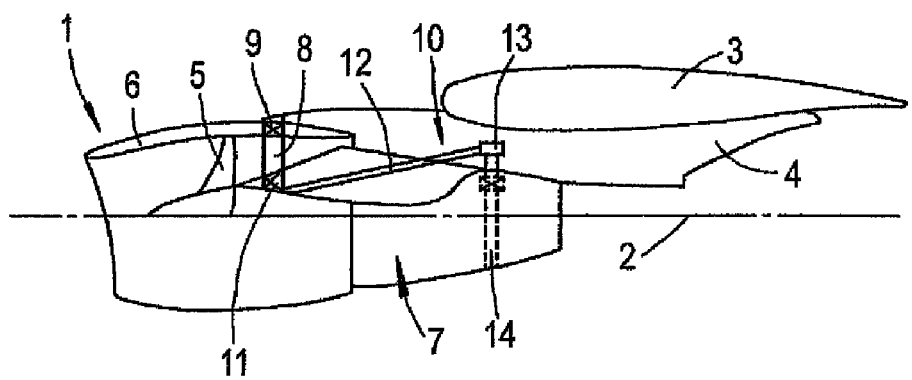
FIG. 1 is a schematic representation of a gas turbine engine mounted to a pylon of an aircraft wing.

Referring now in more detail to FIG. 1, there is illustrated a gas turbine engine 1 having a principle rotational axis 2. The engine 1 is mounted to the wing 3 of an aircraft via a pylon 4. As will be understood, the pylon 4 is securely mounted to the wing 3 so as to extend generally and downwardly from the wing in order to receive the engine 1. The gas turbine engine 1 includes a generally conventional ducted fan 5. The duct is defined by a cowl 6 and the fan 5 is driven by a core engine indicated generally at 7 in a generally conventional manner. Just aft of the fan 5, the engine is provided with a forward frame 8 which is fixedly mounted to the engine. A forward mount 9 fixedly joins the forward frame 8 to the pylon 4.

Aft of the forward frame 8 and the associated forward mount 9, there is provided a thrust mount arrangement 10 generally in accordance with the present invention and which extends between the hub 11 of the forward frame 8 and the pylon 4 in order to transmit the thrust forces generated by the engine 1 to the pylon 4. As will be explained in further detail below, the thrust mount 10 comprises a pair of thrust links 12 and an aft mounting bracket 13 which is fixedly mounted to the pylon 4 and which supports an aft engine frame 14 extending generally around the turbine section of the core engine 7. The forward frame 8 and the aft frame 14 are both disposed generally coaxially about the rotational axis 2 of the engine.

Figure 2:
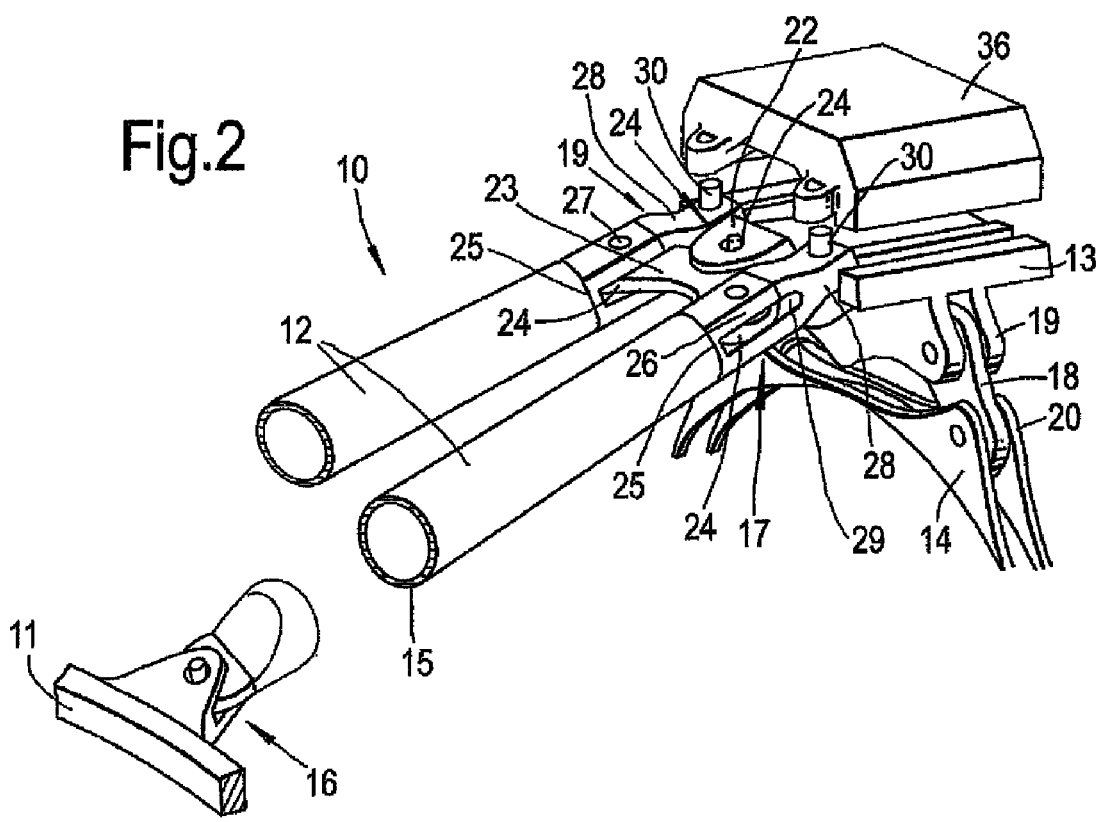
FIG. 2 is a schematic perspective view from the front and one side of a thrust mount arrangement in accordance with the present invention.

FIG. 2 illustrates the thrust mount arrangement 10 in further detail, and it can be seen from this drawing that the thrust links 12 are elongate in form and preferably take the form of substantially hollow tubes having a generally circular cross-section, indicated generally at 15. Each thrust link 12 has a forwardmost end 16 which is pivotally connected to the central hub 11 of the forward engine mounting frame 8 in a generally conventional manner. At their aft ends 17, the thrust links 12 are each connected to the engine mounting bracket in a manner which will be described in more detail hereinafter.

As indicated above, the engine mounting bracket 13 is connected to the aft engine frame 14 in order to support the weight of the rear part of the engine. As illustrated in FIG. 1, this connection is effected by a pair of active links 18 (only one of which is illustrated in FIG. 2) as has been proposed previously. Each active link 18 is pivotally connected to the engine mounting bracket 13, on a respective side of the bracket, via an upper clevis arrangement 19 which is formed integrally with the bracket and which depends downwardly therefrom. At its lowermost end, each active link 18 is pivotally connected to a respective lower clevis arrangement 20 formed as an integral part of the aft engine frame 14 and which extends generally upwardly therefrom.

The engine mounting bracket 13 is provided with a central clevis 21 which extends generally forwardly from the forwardmost end face of the bracket. The clevis 21 comprises a pair of spaced apart and generally parallel tines, although as will noted only the upper tine 22 is visible in FIG. 2. The upper and lower tines have a generally similar configuration to one another and both are arranged so as to extend from the main part of the mounting bracket 13 with a downward angle so as to be directed generally towards the hub 11 of the engine forward frame and its points of connection to the forwardmost ends 16 of the thrust links 12. As will thus be appreciated, the tines 22 of the central clevis 21 are thus inclined relative to the longitudinal rotational axis 2 of the engine by substantially the same angle as are the two thrust links 12.

Received between the two tines 22 of the central clevis 21 is the central part of a thrust balance beam 23. The thrust balance beam is pivotally connected to the central clevis 21 in a generally conventional manner via a pivot pin 24. The thrust balance beam 23 is substantially symmetrical in form and has a pair of outwardly directed lugs 24 for pivotal connection to respective thrust links 12 in the region of their aft ends 17.

At a longitudinal position indicated generally at 25 which is spaced a short distance forwardly from the extreme aft end 17, each thrust link 12 is bifurcated so as to define a pair of spaced apart tines 26, between which a respective lug 24 of the thrust balance beam 23 is received. The lugs 24 of the balance beam are pivotally connected to the respective thrust links 12 by a generally conventional pivotal connection, for example via a pivot pin or bolt 27 extending between the spaced apart tines 26 and passing through an aperture formed through the respective lug 24.

At a position located immediately aft of the pivotal connection between the thrust link 12 and a respective lug of the balance beam 23, generally adjacent to the longitudinal position of the central clevis 21, the spaced apart tines 26 of each thrust link 12 recombine so as to form a generally rectangular-shaped extension 28 at the extreme aft end 17 of each thrust link 12. In this manner, a slot 29 is provided which extends transversely through each thrust link 12, between the two tines 26 and which receives a respective lug 24 of the balance beam 23.

The aft extensions 28 each carry opposed upwardly and downwardly directed projections 30. FIG. 2 only illustrates the respective upwardly directed projections, but FIG. 3 and FIG. 4 both clearly illustrate the opposed downwardly directed projections. In the particular embodiment illustrated in FIGS. 2 to 4, the upper and lower projections 30 of each thrust link 12 are angled relative to the central longitudinal axis of the thrust link 12 so as to extend generally perpendicular to the longitudinal rotational axis 2 of the engine. Furthermore, in the particular arrangement illustrated in FIGS. 3 and 4, the upper and lower projections 30 each take the form of oppositely directed spigots formed integrally with the aft extension 28 of the thrust link 12.

As indicated most clearly in FIG. 4, the lower projection 30 of each thrust link 12 is received within a corresponding recess 31 formed in a forwardly and downwardly extending lug 32 formed integrally with the engine mounting bracket 13. It is important to note that the lower projection 30 is received as a loose, clearance fit within the recess 31 such that an annular clearance gap 33 is formed between the outermost peripheral surface of the projection 30 and the innermost surface of the recess 31.

In a similar manner, the upper projection 30 of each thrust link 12 is received within a corresponding recess 34 formed in a forwardly and downwardly extending lug 35 which is formed as an integral part of the pylon 4. More particularly, the lug 35 and recess 34 are formed in the forwardmost part of a pylon mounting pad which forms part of the pylon and is configured to fixedly receive the engine mounting bracket 13. The upper projection 30 is thus received as a loose, clearance fit within the upper recess 34 formed in the pylon mounting pad 36, and an annular clearance gap 37 is thus defined between the projection 30 and the recess 34 in a similar manner to that formed around the lower recess 30.

FIG. 2 actually illustrates the engine mounting bracket 13, and the two thrust links 12 disengaged from the pylon mounting pad 36, and therefore effectively shows the situation during attachment of the engine to an aircraft wing via the mounting arrangement of the present invention. As will thus be appreciated, the engine mounting bracket 13 may first be connected to the aft engine frame 14 via the two active links 18, and the forwardmost ends 16 of the two thrust links 12 may be pivotally connected to the hub 11 of the forward engine frame 8. The aft ends 17 of the two thrust links 12 may then be connected to the engine mounting block 13 via the thrust balance beam 23, such that the two downwardly depending, lower projections 30 are received within the respective recesses 31 provided at the front of the mounting bracket 13. The mounting bracket 13, together with the connected thrust links 12 and the engine may then be lifted so as to be offered up to the underside of the pylon mounting pad 36 in a generally vertical direction. The perpendicular orientation of the upper and lower projections 30 relative to the generally horizontal rotational axis 2 of the engine facilitates this vertical presentation of the mounting bracket 13 and the thrust links 12 to the pylon mounting pad 36 and allows the upwardly directed upper projections 30 carried at the aft ends of the two thrust links 12 to be conveniently aligned with their corresponding recesses 34 formed in the pylon mounting pad 36. The engine mounting bracket 13 can then be moved substantially vertically upwardly so as to engage the pylon mounting pad 36, whereafter the engine mounting bracket 13 is fixedly connected to the pylon mounting pad 36 in a generally conventional manner such as, for example, via the use of a plurality of mounting bolts.

As illustrated most clearly in FIG. 4, when the thrust mount arrangement 10 of the present invention is fully assembled as described above, the aft ends of each thrust link 12 are effectively held captive between the interconnected pylon mounting pad 36 and the engine mounting bracket 13. As is also illustrated in FIG. 4, the central longitudinal axis of each thrust link 12 extends directly into the pylon via the pylon mounting pad 36.

It is to be appreciated that during normal operation of the aircraft and aircraft engine 1, the thrust links 12 carry the axial engine loads to the pylon 4 via the thrust balance beam 23 and the engine mounting bracket 13. During such normal operational conditions, the projections 30 formed at the aft ends of the thrust links 12 are spaced from the inner surfaces of their corresponding clearance recesses 31, 34 such that the projections 30 are coaxially disposed within the clearance recesses in a manner sufficient to substantially maintain the clearance gaps 33, 37. Thus, during normal operating conditions, no loads are carried by the projections 30 and their corresponding recesses 31, 34, and so these components remain substantially unstressed during normal operation and are not subject to any fatigue loadings.

In the unlikely, and rare, event of a failure in the primary load path defined by the thrust links 12, the balance beam 23 and the engine mounting bracket 13, the engine 1 will move slightly with regard to the pylon and the integral pylon mounting pad 36. In this situation, the lower projections 30 carried at the aft ends of the thrust links 12 will engage with the inner surfaces of their corresponding clearance recesses 31. Also, and importantly, the upper projections 30 will similarly engage with the inner surfaces of their corresponding clearance recesses 34 formed in the pylon mounting pad 36. This engagement between the upper projections 30 and the clearance recesses 34 provided in the mounting pad 36 serves to directly interconnect the thrust link 12 with the pylon in the event of a failure occurring in the primary load path. As will thus be appreciated, the mounting arrangement of the present invention is configured to define an auxiliary load path between the engine and the pylon via direct engagement between the or each remaining thrust link 12 and the pylon, independently of the mounting bracket 13.

Whilst the embodiment of the invention described above and illustrated in FIGS. 2 to 4 is configured such that the upper and lower projections 30 each take the form of oppositely directed spigots formed integrally with the aft extension 28 of the thrust link 12, it is envisaged that in alternative embodiments the upper and lower projections 30 could instead take the form of opposite ends of a single pin or bolt extending, as a clearance fit, through an aperture formed in the extension 28. In such an arrangement, the pin or bolt would be arranged so as to extend through the lug 32 of the engine mounting bracket 32 and through the lug 35 of the pylon mounting pad 36, with the clearance provided between the central region of the pin or bolt and the aperture formed through the extension 28 allowing for assembly tolerances and normal operational deflections.

FIGS. 5 to 7 illustrate an alternative embodiment of the present invention, and in FIGS. 5 and 6 one of the two thrust links 12 is omitted for the sake of clarity. FIGS. 5 and 6 thus more clearly illustrate the shape and configuration of the thrust balance beam 23 and the central clevis 21, the configuration of which substantially corresponds to the arrangement described above and illustrated in FIGS. 2 to 4.

It is to be noted that in the arrangement of FIGS. 5 to 6, the upwardly and downwardly directed projections 30 (which in the arrangement of FIGS. 2 to 4 either took the form of spigots or opposite ends of a mounting pin) are replaced by a single formation 38 provided at the extreme aft end 17 of each thrust link 12. As illustrated most clearly in FIG. 5, the formation 38 takes the form of a circular flange extending outwardly from the periphery of the thrust link extension 28, which in this embodiment is substantially cylindrical in form. As will therefore be appreciated from FIG. 7, the uppermost region of the circular formation 38 effectively defines an upper projection 39, whilst the lower region of the formation 38 effectively defines a lower projection 40. As will also be appreciated from FIG. 7, in this embodiment, the upper and lower projections 39, 40 each extend in a direction that is substantially perpendicular to the longitudinal axis of the respective thrust link 12.

The engine mounting bracket 13 is provided with a generally arcuate clearance recess 41 which is sized and configured so as to receive the lower projection 40 defined by the lower region of the circular formation 38 as a clearance fit, whilst the pylon mounting pad 36 is similarly provided with an upper arcuate clearance recess which is sized and configured to receive the upper projection 39 as a clearance fit.

As in the case of the arrangement of FIGS. 2 to 4, it is advantageous to configure the arrangement so that the pre-assembled thrust link and engine mounting bracket assembly can still be offered up to the aircraft pylon in a substantially vertical direction, due to the very significant weight of the engine which must be supported. In order to achieve this, despite the upper projections extending substantially perpendicular to the longitudinal axis of the thrust links, the forward face of the upper projections 39 are thus each chamfered, as indicated at 38a in FIG. 5, which allows the upper projections to be received within their respective recesses 42 in a substantially vertical direction. It is also possible to chamfer the forward faces of the lower projections 40 in a similar way for receipt in the recesses 41. In other respects, the arrangement of FIGS. 5 to 7 operates in a substantially identical manner to that described above and illustrated in FIGS. 2 to 4.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An aircraft comprising a pylon, a gas turbine engine, and a thrust mount arrangement, the pylon comprising a mounting pad, the thrust mount arrangement comprising:
   a mounting bracket fixedly mountable to the pylon; and
   a pair of thrust links connected to the mounting bracket and connectable to the engine so as to define in combination with the mounting bracket a primary load path between the engine and the pylon to carry engine loads under normal operating conditions, each thrust link being configured to engage the mounting pad directly in an event of failure of the primary load path, so as to define an auxiliary thrust load path between the engine and the pylon, and each thrust link being held captive between the mounting pad and the mounting bracket when the mounting bracket is fixedly mounted to the mounting pad.

2. The aircraft of claim 1, wherein the thrust mount arrangement is configured so that during the normal operating conditions each thrust link does not engage the pylon.

3. The aircraft of claim 1, wherein the pylon further comprises a respective clearance hole or recess within which a first part of each thrust link is received, the arrangement being configured such that during the normal operating conditions the first part of each thrust link is spaced from an inner surface of its respective hole or recess by a clearance gap, but is arranged to engage the inner surface in the event of failure of the primary load path.

4. The aircraft of claim 3, wherein the mounting bracket comprises a respective clearance hole or recess within which a second part of each thrust link is received, the arrangement being configured such that during the normal operating conditions the second part of each thrust link is spaced from an inner surface of its respective hole or recess provided in the mounting bracket by a clearance gap, but is arranged to engage the inner surface in the event of failure of the primary load path.

5. The aircraft of claim 4, wherein each clearance hole or recess provided in the mounting bracket is arranged so as to be aligned with and opposed to a respective clearance hole or recess provided in the pylon across an interface between the pylon and the mounting bracket when the mounting bracket is fixed to the pylon.

6. The aircraft of claim 3, wherein the first part of each thrust link comprises a projection extending substantially perpendicular to a longitudinal axis of each thrust link, respectively.

7. The aircraft of claim 6, wherein the projection is a spigot.

8. The aircraft of claim 6, wherein the first part of each thrust link is defined by one end of a pin extending through each thrust link, respectively, and a second part of each thrust link is defined by an opposite end of the pin.

9. The aircraft of claim 3, wherein the first part of each thrust link comprises a projection extending substantially perpendicular to a rotational axis of the engine.

10. The aircraft of claim 3, wherein each thrust link is connectable at a first end to the engine, and is pivotally connected in a region of an opposite second end to a thrust balance beam, the thrust balance beam being pivotally connected to the mounting bracket, and the first part of each thrust link being provided at the opposite second end.

11. The aircraft of claim 1, wherein each thrust link is connectable at a first end to the engine, and is pivotally connected in a region of an opposite second end to a thrust balance beam, the thrust balance beam being pivotally connected to the mounting bracket.

12. The aircraft of claim 11, wherein each thrust link is pivotally connected to the balance beam at a point spaced inwardly of the opposite second end.

* * * * *